United States Patent
Armiroli et al.

(10) Patent No.: US 7,954,785 B2
(45) Date of Patent: Jun. 7, 2011

(54) HYDRAULIC SLIDE VALVE PROVIDED WITH A PIEZOELECTRIC WASHER

(75) Inventors: Jean Armiroli, Beaulieu-sur-Mer (FR); Aime Goubely, La Trinite (FR); Jean-Louis Magnaval, Saint Laurent du Var (FR); Pascal Audineau, Menton (FR)

(73) Assignee: BorgWarner Inc., Auburn Hills, MI (US)

( * ) Notice: Subject to any disclaimer, the term of this patent is extended or adjusted under 35 U.S.C. 154(b) by 449 days.

(21) Appl. No.: 10/583,219

(22) PCT Filed: Dec. 17, 2004

(86) PCT No.: PCT/FR2004/003279
§ 371 (c)(1),
(2), (4) Date: Jun. 8, 2007

(87) PCT Pub. No.: WO2005/061935
PCT Pub. Date: Jul. 7, 2005

(65) Prior Publication Data
US 2008/0135792 A1 Jun. 12, 2008

(30) Foreign Application Priority Data
Dec. 18, 2003 (FR) .................................. 03 14918

(51) Int. Cl.
*F16K 31/12* (2006.01)
(52) U.S. Cl. .................. 251/44; 251/129.06; 251/30.04
(58) Field of Classification Search ............... 251/30.01, 251/30.03, 30.04, 129.06, 43–44
See application file for complete search history.

(56) References Cited

U.S. PATENT DOCUMENTS

| | | | | |
|---|---|---|---|---|
| 1,331,707 A | * | 2/1920 | Haas | 4/337 |
| 1,646,640 A | * | 10/1927 | Daniel | 251/24 |
| 1,925,301 A | * | 9/1933 | Campbell | 251/28 |
| 3,903,919 A | * | 9/1975 | Zeuner | 137/489 |
| 4,383,195 A | | 5/1983 | Kolm et al. | |
| 4,561,627 A | | 12/1985 | Meckstroth | |
| 4,570,849 A | * | 2/1986 | Klaucke et al. | 236/35 |
| 4,592,533 A | * | 6/1986 | Guglielmi et al. | 251/30.01 |
| 4,777,921 A | * | 10/1988 | Miyaki et al. | 123/456 |
| 4,989,277 A | * | 2/1991 | Tsutsui et al. | 4/367 |
| 5,542,384 A | * | 8/1996 | Rosenmann et al. | 123/179.31 |
| 5,564,673 A | * | 10/1996 | Pieren | 251/30.03 |
| 6,021,996 A | * | 2/2000 | Nakayoshi | 251/30.02 |
| 6,149,124 A | * | 11/2000 | Yang | 251/30.03 |
| 2003/0226988 A1 | * | 12/2003 | Cotton et al. | 251/129.06 |
| 2004/0074985 A1 | * | 4/2004 | Rado | 239/102.2 |

FOREIGN PATENT DOCUMENTS
GB 1 350 379 4/1974
GB 2 051 312 1/1981

OTHER PUBLICATIONS

Patent Abstracts of Japan—Publication No. 60065968, publication date Apr. 15, 1985 (1 page).
International Search Report dated Apr. 21, 2005 (3 pages).

* cited by examiner

Primary Examiner — John K Fristoe, Jr.
Assistant Examiner — Marina Tietjen
(74) Attorney, Agent, or Firm — Reising Ethington P.C.

(57) ABSTRACT

The invention relates to a hydraulic slide valve for controlling flow-rate or pressure comprising at least one movable valve moving from a closed position by contacting a seat and an open position remote therefrom, the displacement of said valve being controlled by a piezoelectric washer.

19 Claims, 3 Drawing Sheets

HYDRAULIC SLIDE VALVE PROVIDED WITH A PIEZOELECTRIC WASHER

The present invention relates to a hydraulic valve for controlling flow rate or pressure including at least a translationally mobile flap between a closed position in contact with a seat and an open position at a distance from the latter, the displacement of said flap being controlled by a piezoelectric part.

Hydraulic valves including a piezoelectric component are already known and used. The existing solutions for example include piezoelectric bars which develop a very large force but provide a small displacement. This bar configuration however has drawbacks: such a part, considering its volume, tends to expand under the effect of an increase in temperature, and it is therefore necessary to provide temperature compensation. The latter is notably achieved by the existence of a hydraulic cushion located between the bar and the mobile part of the valve.

Moreover, the significant force generated by such bars, for example of the order of 2,000 N for bars with a length of 30 mm, and which is notably due to an amplification effect resulting from the geometry of the part, may cause wear of the components of the valves which are equipped with them or, at the very least, may have an effect on the tolerances of said components.

The ageing of the bar component may change its length on the one hand, and cause a disturbance of the valve because of the change of the relative positions of the flap and its seat: a valve basically closed for zero voltage may no longer be able to close properly, etc.

The designers of such valves have provided systems for compensating or finding a remedy to these drawbacks, systems which however make the solenoid valve substantially more complicated. This is all the more true that always because of its elongated structure, the bar should be pre-stressed. This axial pre-stress has the purpose of always having the bar work in compression, even when it lengthens, in order to improve its characteristics and its life time.

Finally, in order to obtain short response times upon opening and closing the valve, which is the main sought-after goal when the piezoelectric component is integrated into a valve, a return string should be added, which assists in bringing the components back against the piezoelectric bar when it resumes its initial length. The operation and development of the solenoid valves because of all these related constraints, are complicated.

As an alternative to the bar configuration, valves were equipped with piezoelectric double strips, which have the main advantage of providing larger strokes (of the order of 1 mm). But the force developed by such a double strip is small (of the order of 10 N), which proves to be a penalty. At least one spring for reducing the response time, should always be provided at least in one direction.

The piezoelectric double strip configurations are further fragile and require specific structures which substantially complicate them so that the number of operating cycles may increase.

The object of the present invention is to propose a much simpler and reliable configuration which notably avoids the use of additional systems, i.e., not directly dedicated to the main function exerted by the valve. The goal is also to reduce the costs, notably by suitably selecting the piezoelectric component.

For this purpose, the hydraulic valve for controlling flow rate and pressure of the invention is mainly provided with a piezoelectric part as a ring disc.

This part, in addition to its compactness, and consequently its cost price much less than that of the aforementioned bars, provides multiple advantages. Firstly, it has no need to be mechanically pre-stressed in order to operate. Next, it does not require any temperature compensation, temperature differences do not produce any significant effect on it. It also has a response time which is very favorable for applications in hydraulic valves. Its ageing is finally not expressed by dimensional changes capable of generating malfunctions.

The axial force/displacement ratio is further quite suitable for this type of application. The ring discs actually develop an axial force and displacement respectively larger than that produced by double strips and bars (for example 100 microns for 200 volts) which makes them particularly well adapted components, moreover they may be easily integrated in many configurations of hydraulic solenoid valves.

Preferably, in order to efficiently benefit from the good compromise provided by the ring disc in terms of exerted axial displacement force, the axis of the ring disc in the hydraulic valve of the invention is parallel to the translational axis of the valve.

The axisymmetry of said ring disc actually results in that the resultant of the forces is localized on the axis of the ring disc. It is along this axis that the maximum displacement further occurs. It is therefore preferable to operate in this direction.

Multiple configurations and alternatives of valves based on such a ring disc are of course possible according to their destinations, the flow rates or pressures to be handled, etc. For example, the hydraulic valve may be pressure-compensated notably for reducing the forces on the parts.

According to one possibility, a first needle may be fixed to the piezoelectric ring disc, capable of blocking a first port connecting a low pressure hydraulic chamber to a high pressure hydraulic chamber, the flap of the valve consisting of a second needle blocking a second port connecting the high and low pressure chambers respectively. When the first needle opens the first port, balancing of the pressures between the low pressure chamber and the high pressure chamber occurs gradually, which leads to a displacement of the second needle, i.e., of the flap, which moves away from its seat. Conversely, when the first needle again closes the port, pressure again increases upstream from the second needle, i.e., from the flap, which again closes in contact with its seat. The more the first needle closes, the more the closing force applied to the flap increases. The reverse occurs upon opening, in both cases by means of different sections of the needle.

It should be noted that this type of solenoid valve, in the design shown, does not actually have a proportional behavior. When the voltage across the terminals of the ring disc is increased gradually, the first needle begins to open because of the deformation of the piezoelectric ring disc, and the second needle completely opens when the displacement of the ring disc is sufficient to cause the pressure to drop in the high pressure hydraulic chamber. From this moment onwards, if the voltage applied to the piezoelectric component is further increased, the valve will not open further.

To simulate the proportionality, the valve needs to be controlled through cycles, by a signal at a frequency which is compatible with the response time of the piezoelectric ring disc, so that the valve is actually controlled by said signal, the duty cycle is then variable and the frequency is fixed. This control possibility is only possible because the valve, owing to the piezoelectric ring disc, is fast. This rapidity, obtained at a low cost, leads to good accuracy for controlling the flow rate or the pressure, according to the case.

The aforementioned pressure compensation configuration further allows a highly simplified initial mechanical adjustment because both needles are independent of each other and have a specific mechanical relationship with the valve.

Preferably, the first needle is fixed at the centre of the ring disc, and has a displacement axis coinciding with the axis of the ring disc. With this configuration, the yield may be optimized by making the most out of the geometrical characteristics of the ring disc: the displacement and the exerted force are maximum along this axis.

The second needle, i.e., the flap, is mobile and translationally guided between its seat and an abutment located along the axis of its displacement, opposite said seat.

The pressure difference therefore only allows it to translationally move along one direction, and in both directions depending on the relative state of the pressures in the high pressure chamber and in the low pressure chamber.

According to the invention, the second needle forming the flap includes an internal axial cavity opened on the outside. With this cavity, the mass of the flap may be reduced, and therefore its inertia may be reduced and consequently the response times upon opening and closing.

More preferably, said cavity includes two apertures respectively positioned opposite and in proximity to the portion of the needle which cooperates with the seat of the flap, located in the same hydraulic chamber, with the same purposes as before.

According to one possibility, access to the first port, i.e., the one which may be blocked by the first needle fixed to the ring disc, is partially blocked in the high pressure chamber by a part which substantially restricts the passage of the fluid which should cross a channel with a small diameter, less than that of said first port, therein.

With such a restriction, it is possible to obtain the effect of a spring, but without its drawbacks. It will be seen subsequently that it is however possible to design a version of the valve of the invention with a spring notably with which fast closing of the valve may be promoted.

With the version of the valve of the invention with pressure compensation, as explained before, effected on high pressure, the aforementioned problems of parasitic thermal expansions and of changes in tolerance may be avoided without however substantially changing the response rate of the valve.

Balancing of the pressures is actually effected very rapidly, as the volumes of the hydraulic chambers are small, particularly at the seat of the valve and behind the needle. With this, it is also possible to reduce the hydraulic jerks on the moving parts, and to protect them from wear which would result from this.

It is also possible to apply a version with direct actuation of the flap, in which the latter consists of a needle directly fixed to the ring disc and capable of blocking a single port connecting a high pressure hydraulic chamber to a low pressure hydraulic chamber.

In this type of so-called direct valve, the design should be more focused on the possibility of refining the mechanical adjustments, which may be more delicate to carry out. The main advantage is to lead to a slight reduction in the response time, both for opening and closing the valve.

In this direct configuration, the needle forming a flap is preferably located in the high pressure chamber. In both versions of the invention, the piezoelectric ring disc is located in the low pressure hydraulic chamber.

In other words, in both cases, the needle forming the flap is located in the high pressure chamber whereas the piezoelectric component which controls said flap, is located in the low pressure chamber. This structure is not strictly necessary, but it is essential because it is both more immediate and easier to apply.

As mentioned earlier, a spring may be applied against the piezoelectric ring disk in order to exert a return force stressing said disk in the direction for closing the port controlled by the needle which is fixed therein.

Chiefly, with this spring, it is basically possible to reduce the response time upon closing. However, it should be recalled that, taking into account the design characteristics of the valve of the invention and of the operating choices made, said valve perfectly operates without any spring.

Among said selections, the solenoid valve with piezoelectric components may belong to two groups of solutions: a group of configurations in which the flap is closed for a zero control voltage and a second group which gives greater importance to the inverse assumption.

Preferably, the hydraulic valve of the invention belongs to the first named group, i.e., the valve is closed when the voltage across the terminals of the piezoelectric ring disc is equal to zero.

This selection moreover conditions a certain number of design options which are stated in this description, notably combined with another feature used within the scope of the invention, i.e., the ring disc is deformed at zero voltage so that it has a concavity (FIG. 3) directed towards the needle which is fixed to it.

With this pre-stress, it may in this case exert a closing force on the needle which is fixed to it, by a spring effect, without however impeding the displacement of the ring disc in the direction of the opening and under the effect of the voltage.

Under these conditions, the maximum force of the piezoelectric ring disc is exerted for zero displacement. When the movement is initiated, the displacement of the ring disc increases, and the available force decreases. But this is no longer a problem because the necessary operative force is also reduced, because of the pressure compensation provided by the invention.

With this design, it is also possible even in the absence of a spring, to accelerate the closing, since the closer to the closing position, the more the force increases. This goes in the direction of maximum efficiency for guaranteeing the seal upon closing as the inertia of the mobile part of the valve is accelerated during the instants when this is most necessary.

Moreover, according to a possibility, the ring disc may have ports distributed over its crown. This feature also promotes rapid displacement as the holes in the crown promote the passage of fluid, which reduces the resistance to motion.

To summarize, with the configuration of the invention based on the use of a piezoelectric ring disc, the volume of the piezoelectric material may be reduced, and therefore the cost of the whole, but also sufficient force and axial displacement may be made available for use in a hydraulic valve. The advantage of the use of such a component is notably the rapidity of the response time which it provides, and the improvement in the accuracy of the (flow rate and/or pressure) adjustment which results therefrom. The tolerance problems on a piezoelectric component no longer exist, with which upon assembly, closing of the valve may notably be easily provided when the latter belongs to the group of solutions with a closed flap when the current is zero, a closing further being guaranteed by the force due to the deformation of the ring disc. The maximum force, provided in the absence of a control signal, further imparts, a favorable drive to the needle, in the perspective of the response rapidity in the presence of a signal.

As opposed to solutions based on piezoelectric bars, the ring discs are not subject to any substantial dimensional change when they age. Their shape with a surface appearance further guarantees their flexibility and a compact solution may be applied. Finally, it is no longer to proceed with mechanical amplification, and therefore one can get rid of any system for this purpose.

The absence of additional systems for compensating the aforementioned problems leads to a solution with less parts, therefore much less costly than the solutions of the prior art, and more reliable.

The invention will now be described in more detail, with reference to the appended figures for which:

Figure 1:
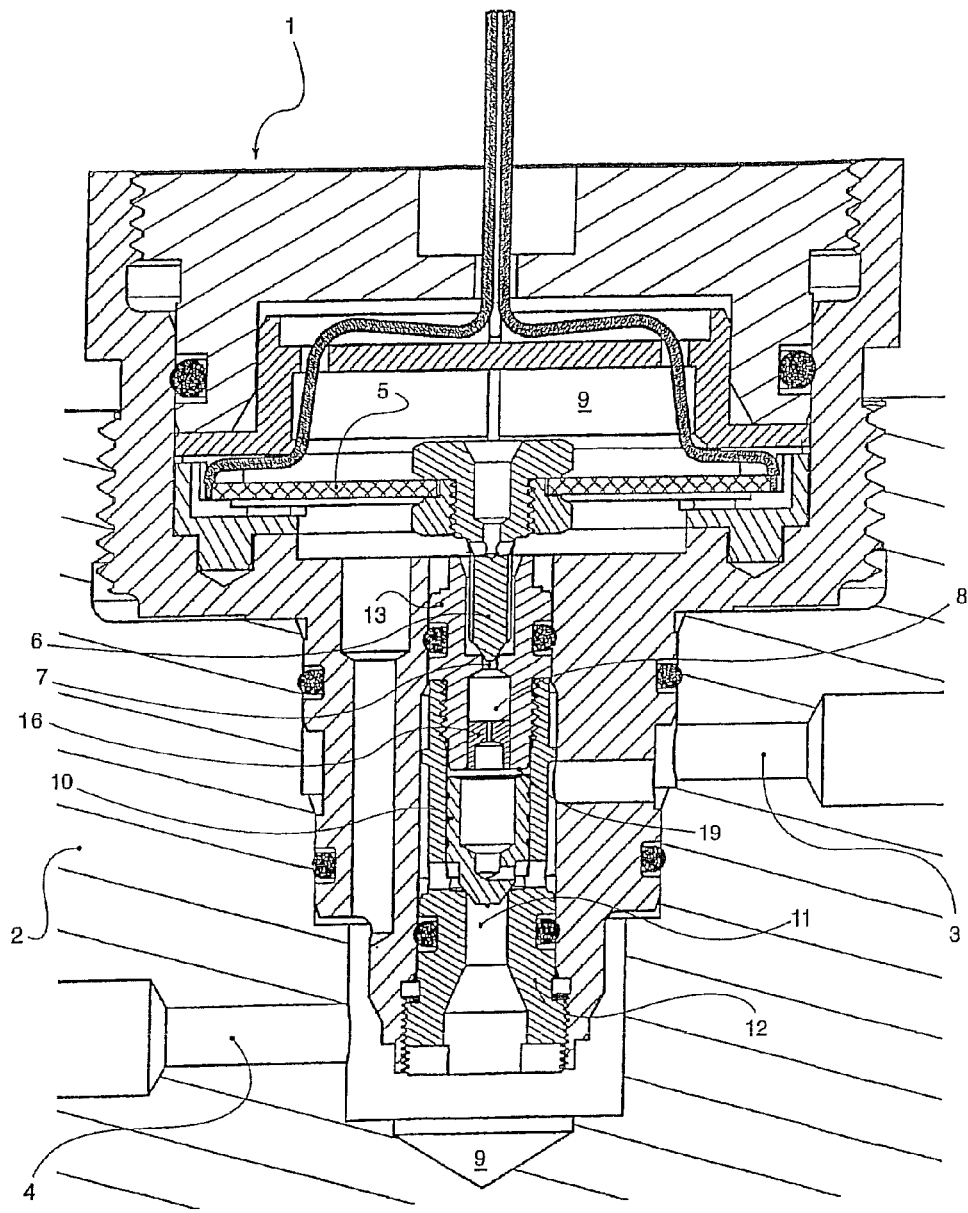
FIG. 1 is a longitudinal sectional view of a hydraulic solenoid valve according to the invention, in a version with pressure compensation.

With reference to FIG. 1, the solenoid valve (1) of the invention is fixed to a case (2) including a conduit for introducing high pressure fluid (3) on the one hand, and a low pressure fluid outlet conduit (4) on the other hand. The operation of this solenoid valve is based on the existence of a piezoelectric ring disc (5) to which is attached a first needle (6) provided for blocking a port (7) separating a high pressure hydraulic chamber (8) from a low pressure hydraulic chamber (9) in which said piezoelectric ring disc is found (5).

With a second needle (10), it is possible to block the end of a channel (11) connecting the high pressure hydraulic chamber (8) to the low pressure hydraulic chamber (9). As in reality, this second needle (10) is the flap of the hydraulic valve of the invention, the seat of said flap, where the channel (11) opens out, is positioned in a first part (12) also achieving the translational guiding of the flap (10), thereby facilitating the initial adjustments. Said translational displacement is limited by the aforementioned seat on the one hand, and by a second part (13) and an abutment (19) on the other hand, in which the port is provided (7), blocked by the needle (6). The nature of the mechanical relationships between the different customary components of the solenoid valve of the invention, as well as with the intermediate connecting parts, for example for fixing the first needle (6) to the piezoelectric ring disc (5), or the sealing modes (by an O-ring) between said components, are considered to be conventional and therefore known, and so will not be detailed in the present description.

Operation is as follows: when the current powering the piezoelectric ring disc (5) is zero, the needle (6) blocks the port (7). The flap (10) is itself in contact with its seat, and there is no possible communication between the low pressure hydraulic chamber (8) and the low pressure hydraulic chamber (9). On the other hand, when the current is non-zero, the piezoelectric ring disc (5) deforms upwards, and the needle (6) moves away from its seat and opens the port (7). Because of the communication between the high pressure hydraulic chamber (8) and the low pressure hydraulic chamber (9), pressure drops in the first mentioned chamber. As the pressures equalize, the pressure correlatively increases in the low pressure chamber (9), downstream from the needle (10) forming the flap, which opens and unblocks the channel (11).

It should be noted that the thereby described operation is not proportional, because even if the voltage is increased across the terminals of the piezoelectric elements, the needle (10) does not necessarily open further. However, by means of an electronic control with square signals, for which the duty cycle is variable and the frequency is set, it is possible to achieve proportional operation by the response rapidity of the valve, and more particularly of the piezoelectric component.

In the configuration which is illustrated in FIG. 1, pressure control is achieved without any spring. Return of the flap (10) towards its initial position is provided by the pressure difference in the hydraulic portion of the valve.

The fact that the maximum force of the piezoelectric component is exerted for zero displacement provides acceleration of the displacement when the inertia of the mobile portion of the valve is significant, which goes in the direction of an acceleration of the response time of the valve. When the movement is initiated, the displacement increases and the available force from the piezoelectric element decreases, in adequacy with the residual force required for the operation, which is also reduced because of the pressure compensation.

Figure 2:
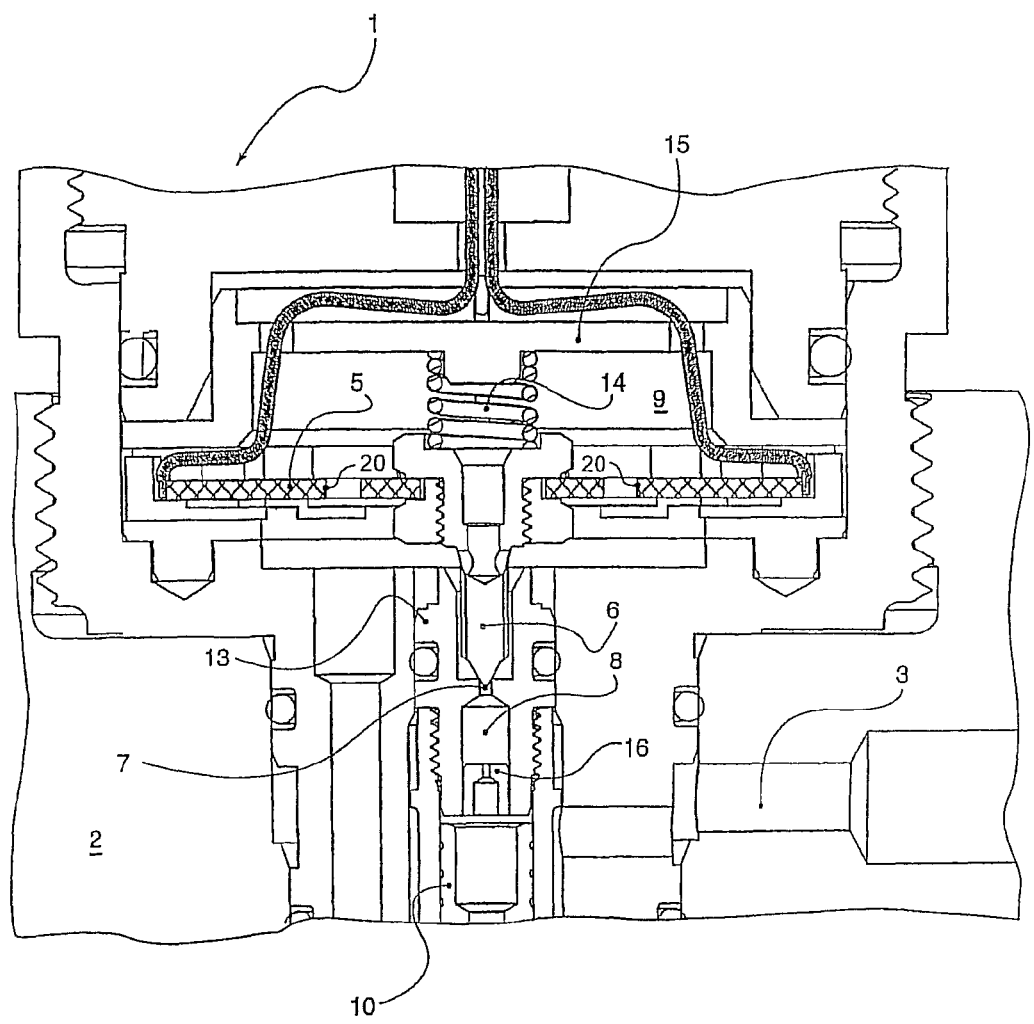
FIG. 2 illustrates an alternative of the configuration of FIG. 1 integrating a spring acting on the subset containing the piezoelectric ring disc.

FIG. 2 relates to an alternative of the solenoid valve of FIG. 1, the only change consisting in introducing a spring (14) between the piezoelectric component (5) and a ring (15) integral with the case of the solenoid valve (1). Integration of the spring initially has the purpose of reducing the response time upon closing. However it is not detrimental to the rapidity of the opening, in particular, if more holes (20) are added into the piezoelectric crown (5) which reduce its resistance to displacement. Indeed, the force due to the pressure and to the flow rate under said ring disc (5) and also under the needle (6), is directed upwards and increases when the stroke of the piezoelectric element and therefore the needle (6) increases. In fact, with this force, it is possible to keep the piezoelectric ring disc in its open position, in spite of the spring and in spite of the fact that at full stroke, the opening force of the piezoelectric element decreases.

When the voltage across the terminals of the piezoelectric element (5) is cut off, the spring contributes to closing. The ports, possibly provided in the crown of the piezoelectric element also promote, the passage of the fluid through said crown but in the opposite direction.

Instead of or in addition to the spring (15), an additional third part (16) may be also provided, positioned in the low pressure hydraulic chamber (8), inside the part (13) containing the port (7) and translationally guiding the first needle (6). This part (16) which limits the passage of the fluid towards said port (7) very substantially, creates a restriction to said passage with which the effect of a spring may be obtained, but without having its drawbacks, since it has no effect on the displacement of the piezoelectric component (5).

Figure 3:
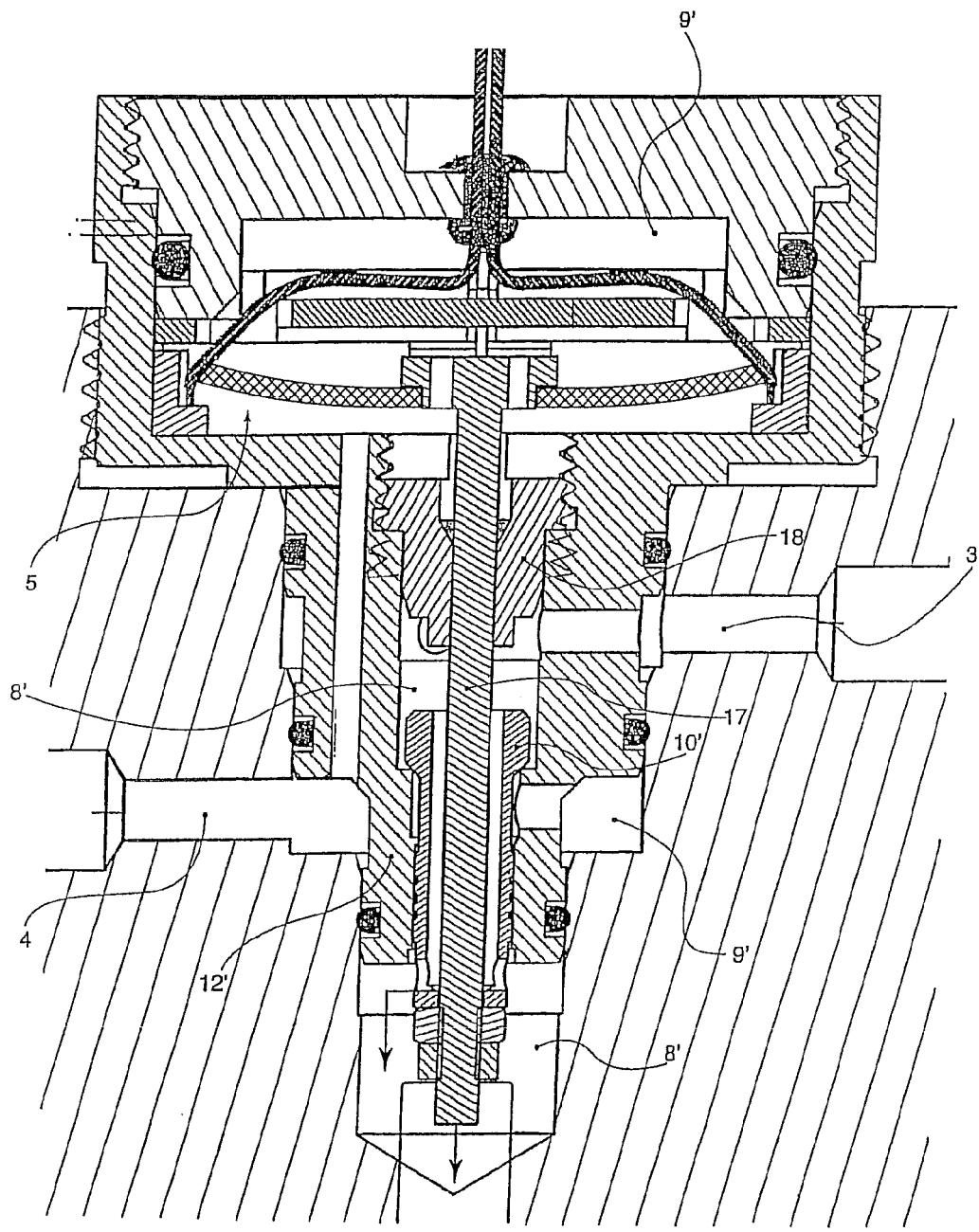
FIG. 3 shows an alternative with direct actuation of the flap of the valve.

The configuration shown in FIG. 3, is with a direct drive. In this case, the needle (10') forming the flap is made directly integral with the piezoelectric ring disc (5) via the shaft (17). Under this assumption, the high pressure hydraulic chamber (8') is localized between a fourth part (18) guiding the shaft (17), and the seat of the flap (10'), contained in an element (12') further contributing to its guiding. When the voltage across the terminals of the piezoelectric element (5) is zero, the flap (10') rests in contact with its seat provided in the part (12'). When the voltage is non-zero, the piezoelectric ring disc (5) deforms upwards, driving the shaft (17) and said flap (10'), which consequently moves away from its seat, and allows pressure exchange between the high pressure hydraulic chamber (8') and the low pressure hydraulic chamber (9').

In the so-called direct design, i.e., with a piezoelectric ring disc (5) directly made integral with the flap (10'), the mechanical adjustment may be more difficult to carry out than in the pressure compensation alternatives. The problem of leaks which may exist between the high pressure (8') and low pressure (9') hydraulic chambers respectively, should also be carefully considered. This being the case, such a design may contribute in reducing the response times upon opening and closing the valve.

In all the alternatives shown earlier, the high pressure hydraulic chambers (8, 8') are for example submitted to a pressure of the order of 200 bars, whereas the low pressure hydraulic chambers (9, 9') are at a pressure from 5 to 5.5 bars. The valves of the invention, which as already mentioned, provide flow rate or pressure controls, may for example be used in automobile injection systems (diesel or gasoline), but also in all the sectors where a fluid should be controlled in flow rate or in pressure, such as automobile braking systems, etc.

The flow rates and the pressures may be significant (240 liters per hour and 2,000 bars for example) and the temperature of use may range up to about +130° C. With this technology, it is therefore possible to observe the constraints on use in an environment such as an automobile engine. The characteristics of the solenoid valves may of course be adapted to each intended use, for example by adapting the diameters according to the provided flow rates and pressures.

Once again, the advantage of the piezoelectric technology, applied to these solenoid valves, is the rapidity of the response resulting in an improvement of the accuracy of this adjustment, whether in flow rate or in pressure. Now, in the future, the response times required by this type of components will be increasingly reduced, and technologies based on coils, if they want to follow the trend, will be increasingly expensive. The use of piezoelectric elements in simple and not very costly configurations is therefore promising.

The invention claimed is:

1. An automotive fluid system valve for controlling flow rate and/or pressure comprising:
    a valve body defining an inlet, an outlet, a seat, a first port, a low pressure chamber, and a high pressure chamber;
    a first valve member moveable between a first valve member closed position and a first valve member open position, wherein at least a portion of the first valve member is in contact with the seat in the first valve member closed position, and the at least a portion of the first valve member is spaced a predetermined distance from the seat when the first valve member is in the first valve member open position, wherein the first valve member has an axial cavity received therein, the axial cavity receiving fluid-flow from the inlet;
    a piezoelectric portion for receiving a voltage, wherein at least a portion of the piezoelectric portion is moveable relative to the valve body, and wherein the piezoelectric portion is a ring disc, the piezoelectric portion having a plurality of holes formed therein which allow the passage of fluid through the piezoelectric portion during use of the valve when the first valve member is in the first valve member open position in order to reduce resistance of the piezoelectric portion to movement thereof, the piezoelectric portion being positioned in the low pressure chamber;
    a first needle coupled to the piezoelectric portion and being moveable between a first needle open position and a first needle closed position, wherein at least a portion of the first needle is in contact with at least a portion of the first port when the first needle is in the first needle closed position, thereby defining a first boundary between the low pressure chamber and the high pressure chamber, and wherein the first valve member, in the first valve member closed position, defines a second boundary between the low pressure chamber and the high pressure chamber; and
    a restriction passageway communicating with the axial cavity of the first valve member, wherein, during use of the automotive fluid system valve, a pressure differential across the restriction passageway creates a change in pressure in the axial cavity causing the first valve member to move.

2. The valve of claim 1, wherein at least a portion of the first valve member is moveable generally parallel to an axis of the piezoelectric portion.

3. The valve of claim 1, wherein the first needle is coupled generally coaxially to a central portion of the piezoelectric portion.

4. The valve of claim 1, further comprising a restriction part interposed between the first valve member and the first needle, wherein the restriction part includes the restricted passageway, and wherein the restricted passageway provides a restricted flow area that is less than a first port flow area when the first needle is in the first needle open position.

5. The valve of claim 1, wherein the first needle includes a body portion and a needle portion, and the body portion is positioned within the low pressure chamber.

6. The valve of claim 1, further comprising a spring exerting a biasing force to bias the first needle toward the first needle closed position.

7. The valve of claim 1, wherein at least a portion of the first valve member defines a portion of the high pressure chamber.

8. The valve of claim 1, wherein the valve body further defines a first valve member abutment, and wherein at least a portion of the first valve member contacts at least a portion of the first valve member abutment when the first valve member is in the first valve member open position.

9. The valve of claim 1, wherein the first valve member is coupled to the piezoelectric portion for moving the first valve member between the first valve member open position and the first valve member closed position.

10. The valve of claim 1, wherein the first valve member is in the first valve member closed position when the voltage is about zero.

11. The valve of claim 1, wherein the piezoelectric portion is configured such that it has a concavity directed towards the first needle when the voltage is about zero.

12. An automotive fluid system valve comprising:
    a valve body defining an inlet, an outlet, and a seat;
    a first valve member moveable between a first valve member closed position and a first valve member open position, wherein at least a portion of the first valve member is in contact with the seat when the first valve member is in the first valve member closed position, and the at least a portion of the first valve member is spaced a predetermined distance from the seat when the first valve member is in the first valve member open position;
    a piezoelectric portion, wherein at least a portion of the piezoelectric portion is moveable relative to the valve body,
    wherein the first valve member is further defined by an axial cavity in fluid communication with the inlet, the valve body is further defined by a low pressure chamber portion and a high pressure chamber portion, the high pressure chamber being formed in part by the axial cavity, the first valve member, when in the first valve member closed position, defines a boundary between the low pressure chamber and the high pressure chamber, and wherein the low pressure chamber is in fluid communication with the high pressure chamber when the first valve member is in the first valve member open position; and a restriction part located in the high pressure chamber and having a restriction passageway which allows the passage of fluid from one side of the restriction part to another side of the restriction part, both sides of the restriction passageway being located in the high pressure chamber, wherein the restriction part remains stationary as the first valve member moves from the first valve member closed position to the first valve member open position, wherein, during use of the automotive fluid system valve, a pressure differential across the restriction passageway creates a change in pressure in the axial cavity causing the first valve member to move.

13. The valve of claim 12, wherein the piezoelectric portion is a disc having a first surface, and wherein at least a portion of the first surface is selectively deformed as the first valve member moves relative to the valve body.

14. The valve of claim 13, wherein a voltage is applied to the piezoelectric portion to deform the at least a portion of the first surface.

15. The valve of claim 12, wherein the first valve member selectively moves between the first valve member closed position and the first valve member open position as a result of deformation of the piezoelectric portion.

16. An automotive fluid system valve comprising:
a valve body defining an inlet, an outlet, a high pressure chamber in fluid communication with the inlet, and a low pressure chamber;
a piezoelectric portion located in the low pressure chamber and moveable relative to the valve body, the piezoelectric portion comprising a ring disc;
a first needle coupled to the piezoelectric portion and moveable between a first needle open position and a first needle closed position, when the first needle is in the first needle closed position the first needle forms a first boundary between the low pressure chamber and the high pressure chamber;
a second needle separate and distinct from the first needle, and moveable between a second needle open position and a second needle closed position, when the second needle is in the second needle closed position the second needle forms a second boundary between the low pressure chamber and the high pressure chamber; and
a restriction part located in the high pressure chamber between the first needle and the second needle, the restriction part having a restriction passageway which allows the passage of fluid from one side of the restriction part to another side of the restriction part, the restriction passageway having a smaller size than a passageway formed at the first boundary;
wherein the high pressure chamber is located between the first needle and the second needle, and when a voltage is applied to the piezoelectric portion, movement of the piezoelectric portion causes the first needle to move to the first needle open position which opens the first boundary and results in a pressure drop in the high pressure chamber, the pressure drop causing the second needle to move to the second needle open position, and wherein, when the first needle moves to the first needle open position, a pressure differential across the restriction passageway facilitates movement of the second needle to the second needle open position.

17. The valve of claim 1 further comprising a restriction part that is separate and distinct from the first valve member and the first needle, the restriction part being located in the high pressure chamber between the first valve member and the first needle, the restriction part having the restriction passageway which allows the passage of fluid from one side of the restriction part to another side of the restriction part.

18. The valve of claim 12 wherein the restriction part is separate and distinct from the first valve member.

19. The valve of claim 12 wherein the first valve member moves from the first valve member closed position to the first valve member open position without the assistance of a spring.

* * * * *

UNITED STATES PATENT AND TRADEMARK OFFICE
CERTIFICATE OF CORRECTION

PATENT NO. : 7,954,785 B2  Page 1 of 1
APPLICATION NO. : 10/583219
DATED : June 7, 2011
INVENTOR(S) : Jean Armiroli et al.

It is certified that error appears in the above-identified patent and that said Letters Patent is hereby corrected as shown below:

Column 4 Line 5; "ring disk" should be "ring disc"

Column 4 Line 6; "said disk" should be "said disc"

Column 4 Line 45; "instants" should be "instance"

Signed and Sealed this
Fourth Day of October, 2011

David J. Kappos
*Director of the United States Patent and Trademark Office*